(12) United States Patent
Chuang

(10) Patent No.: US 7,381,079 B2
(45) Date of Patent: Jun. 3, 2008

(54) LOCKING LINK ROD STRUCTURE FOR A DOCKING STATION

(75) Inventor: Cheng-Hsiang Chuang, Taipei (TW)

(73) Assignee: Inventec Corporation, Taipei (TW)

( * ) Notice: Subject to any disclaimer, the term of this patent is extended or adjusted under 35 U.S.C. 154(b) by 470 days.

(21) Appl. No.: 11/235,311

(22) Filed: Sep. 27, 2005

(65) Prior Publication Data

US 2007/0070598 A1    Mar. 29, 2007

(51) Int. Cl.
*H01R 13/627* (2006.01)
*G06F 1/16* (2006.01)

(52) U.S. Cl. ........................... 439/352; 361/686

(58) Field of Classification Search ............... 361/686, 361/679–685, 687, 724–727; 292/95, 121, 292/124, 128, 108, 102, 300, 304; 248/551, 248/552, 917, 922; 400/88; 439/131, 374, 439/929, 352, 353, 357, 358; D14/300, 434, D14/439, 440; 70/14, 32–34, 57, 58, 158
See application file for complete search history.

(56) References Cited

U.S. PATENT DOCUMENTS 6,741,462 B2 *   5/2004   Kamphuis et al. .......... 361/686

* cited by examiner

*Primary Examiner*—Lisa Lea-Edmonds
*Assistant Examiner*—Nidhi Desai
(74) *Attorney, Agent, or Firm*—Bacon & Thomas, PLLC.

(57) ABSTRACT

A locking link rod structure for a docking station that includes a main body, a switch link rod installed in the main body, two holes disposed separately and proximate to an end of the switch link rod, a lock hole disposed on the main body and corresponding to the two holes for locking an external lock such as a cable lock, and thus the lock link rod structure is capable of locking a notebook computer with the docking station, so as to prevent the notebook computer and/or the docking station from being taken away or stolen by other people.

6 Claims, 3 Drawing Sheets

LOCKING LINK ROD STRUCTURE FOR A DOCKING STATION

FIELD OF THE INVENTION

The present invention relates to a locking link rod structure for a docking station, and more particularly to a locking link rod structure for a docking station capable of locking a notebook computer with the docking station, so as to prevent the notebook computer and/or the docking station from being taken away or stolen by other people.

BACKGROUND OF THE INVENTION

For users who have used a notebook computer at office or at home before, they must have the experience of connecting many cables of the peripherals such as a power cord, a network cable, a mouse cord, a printer cable, or a speaker cable of the notebook computer. If it is necessary to carry the notebook computer, a user has to unplug all of the aforementioned cables and cords, and if the notebook computer is used indoors, then all of these cables and cords have to be plugged again.

To solve the foregoing annoying problem, manufacturers have developed a multifunctional docking station derived from the concept of a mobile architecture. By the multifunctional docking station, a convenient way of installing and removing peripherals is provided. The multifunctional docking station is mainly divided into three kinds according to different functional requirements. The first kind is a basic model having many peripheral ports; the second kind is an expanded model having multibay installed on both sides of the multifunctional docking station for installing more peripherals, in addition to the foregoing various peripheral ports, and thus the notebook computer can be expanded to a multifunctional equipment similar to a desktop computer; and the third kind is an external docking station that uses a universal serial bus (USB) interface to connect the notebook computer.

Since the size of the notebook computer is limited, even an all-in-one model cannot store so many storage devices into the limited space of the notebook computer. Particularly, the space for installing a hard disk drive is very limited. After a user has used the notebook computer for a while, the stored data becomes larger and larger, and thus it is necessary to install an additional hard disk drive or back up the data by a burner. Of course, the user may use a local area network to transmit the data for data processing, but it is more convenient to process the data directly on the notebook computer. By then, the aforementioned multibay provides a flexible storage method, so that the peripherals on the multibay including a second detachable hard disk drive, a burner, a DVD-ROM, and a floppy disk drive can be installed to handle data, or a second battery can be installed to improve the battery time of the notebook computer, or the notebook computer can be swapped with a commercial desktop computer.

The so-called "Expandable mobile architecture" is a concept derived from the above mentioned principle and focusing on its powerful expandability, and thus users can manage to expand their desired functions. The multibay allows a hot swap of different peripherals, and an integration of platforms to satisfy different requirements, and the multifunctional docking station facilitates the installation and removal of various externally connected devices of the notebook computer.

However, if the multifunctional docking station is locked by a lock (such as a cable lock comprises of a lock head and a fixing cable extended outwardly from an end of the lock head), the multifunctional docking station can be prevented from being stolen by others, but the notebook computer installed on the multifunctional docking station can be released from the multifunctional docking station by a release button, so that the notebook computer can be loosened from the multifunctional docking station. Therefore, the notebook computer of the multifunctional docking station can be taken away or stolen by other people and thus causing tremendous damages to the user.

Even though a locking mechanism for simultaneously locking the multifunctional docking station and the notebook computer has been designed, the locking mechanism is relatively complicated and comes with a high cost. Therefore, finding a way of improving the foregoing shortcomings is an important issue for manufacturers to overcome.

SUMMARY OF THE INVENTION

In view of the description above, the inventor of the present invention based on years of experience to conduct extensive researches and experiments, and finally invented a locking link rod structure for a docking station in accordance with the present invention.

It is a primary objective of the present invention to provide a multifunctional docking station to overcome the shortcomings of the prior art to effectively prevent the notebook computer installed on the docking station from being taken away or stolen by others. The technical measure taken for overcoming the shortcomings is to provide a locking link rod structure for a docking station that comprises a main body, a lock hole and an ON/OFF hole disposed on a sideboard of the main body, a retaining base protruded from one side of the main body, a connector disposed on the retaining base, a movable pillar and a movable hook separately disposed on both ends of the connector, a switch link rod movably disposed in the main body, and two holes separately disposed on an end of the switch link rod and corresponding to the lock hole. An end of the switch link rod is exposed from the locking switch of the ON/OFF hole, and another end of the switch link rod is disposed on the main body, and a release button is exposed thereon. The release button is controlled by the movement of the switch link rod. The main body further comprises a link rod therein, a transversal rod of the link rod precisely in contact with the release button, and a suspending arm extended separately from both ends of the transversal rod. The front end of the two suspending arms is situated precisely at the two pillars and under the two hooks for controlling the movements of the two pillars and the two hooks. Regardless of the locking switch being moved to an ON position or an OFF position of the ON/OFF hole, the two holes and the lock hole are moved accordingly, so that an external lock is locked with the holes to make sure that the docking station is installed together with the notebook computer and others cannot take away or steal the notebook computer.

The above and other objects, features and advantages of the present invention will become apparent from the following detailed description taken with the accompanying drawings.

DETAILED DESCRIPTION OF THE PREFERRED EMBODIMENTS

Figure 1:
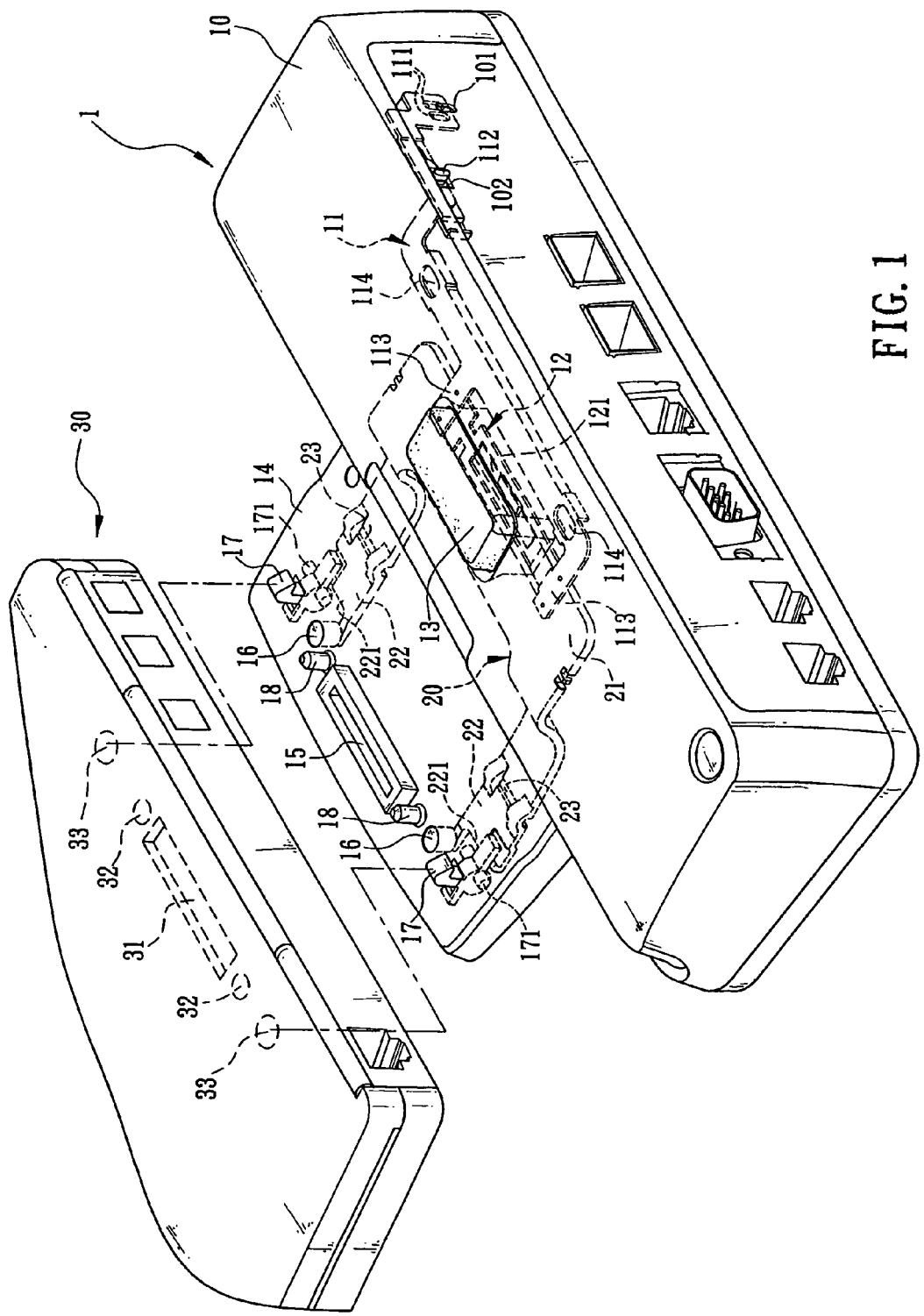
FIG. 1 is a perspective view of a docking station and a notebook computer according to the present invention.
Figure 2:
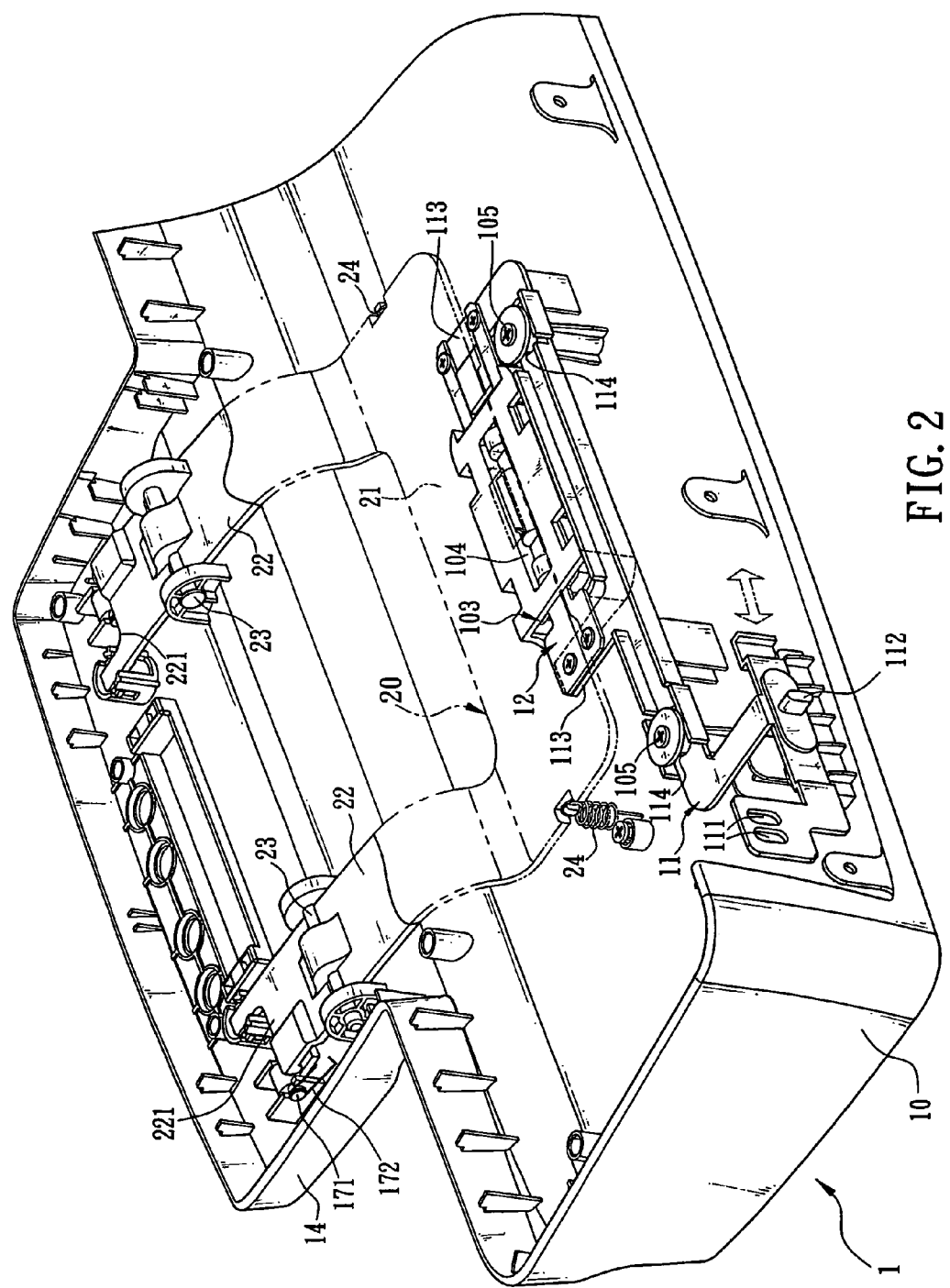
FIG. 2 is schematic rear view of a retaining base of a docking station according to the present invention.

Referring to FIG. 1 for a locking link rod structure for a docking station in accordance with the present invention, the docking station 1 includes a notebook computer 30 installed thereon, and the docking station 1 comprises a main body 10, a switch link rod 11 installed in the main body 10, two holes 111 disposed separately and proximate to an end of the switch link rod 11, a lock hole 101 disposed on the main body 10 and corresponding to the two holes 111 for locking an external lock such as a cable lock (not shown in the figure), and a locking switch 112 disposed at an end of the switch link rod 11 proximate to the two holes 111, and the locking switch 112 is exposed from the ON/OFF hole 102 on the side board of the main body 10. Regardless of the locking switch 112 being moved to an ON position or an OFF position of the ON/OFF hole 102, the two holes 111 correspond to the lock hole 101 to secure the lock, and two support rods 113 with a specific distance apart is extended from another end of the switch link rod 11, and a blocking board 12 is disposed across the two support rods 113. The blocking board 12 includes a penetrating hole 121 at its center, and the blocking board 12 is limited to a limit section 103 inside the housing of the main body 10 as shown in FIG. 2. The limit section 103 includes another penetrating hole 104 at its center, and the other penetrating hole 104 correspond to the penetrating hole 121 as shown in FIGS. 1 and 2. In addition, the rod body of the switch link rod 11 includes two sliding grooves 114 with a specific distance apart as shown in FIGS. 1 and 2. A fixing pillar 105 is disposed separately on two sliding grooves 114, such that the switch link rod 11 can be moved to a related position by the limit section 103, the two sliding grooves 114 and the two fixing pillars 105.

In the present invention, a release button 13 is exposed from the penetrating hole 121 of the blocking board 12 on the main body 10 as shown in FIGS. 1 and 2. When the release button 13 is pressed, the release button 13 will be extended into the penetrating hole 121 and the other penetrating hole 104. If the locking switch 112 moves the switch link rod 11 to the OFF position of the ON/OFF hole 102, the external edge of the penetrating hole 121 of the blocking board 12 is moved to the bottom of the release button 13 to block the release button 13 from entering into the penetrating hole 121, so that the release button 13 cannot be pressed and thus constituting a locked status.

In the present invention, the main body 10 includes a retaining base 14 protruded from a side as shown in FIG. 1, and the retaining base 14 comprises a connector 15 thereon, and a movable pillar 16 and a movable hook 17 disposed separately from both ends of the connector; wherein the two pillars 16 and the two hooks 17 can be moved by the control of a link rod 20 as shown in FIGS. 1 and 2. The link rod 20 is a U-shape rod, and a transversal rod 21 is precisely in contact with the bottom of the release button 13, and a suspending arm 22 is extended separately from both ends of the transversal rod 21, and the front end of the two suspending arms 22 is situated under the two pillars 16 and the two hooks 17 as shown in FIGS. 1 and 2. The two suspending arms 22 include a pivot 23 disposed proximate to the two pillars 16 and the two hooks 17 and pivotally coupled to the backside of the retaining base 14, and a spring 24 is installed separately to both ends of the transversal rod 21 for holding the backside of the retaining base 14 as shown in FIG. 2, so that when the release button 13 is pressed, its bottom will press on the transversal rod 21, and a seesaw action is produced by the two pivots 23. The front end of the two suspending arms 22 is in a finger shape, and will simultaneously prop the bottom of the two pillars 16 and the two hooks 17, and thus the two pillars 16 are exposed from the retaining base 14, and the two hooks 17 are turned to an angle. Until the force of pressing the release button 13 disappears, the two spring 24 will resume the transversal rod 21 to its original status, and thus the two pillars 16 will be drawn back into the retaining base 14, and the two hooks 17 return to their original angle.

Figure 3:
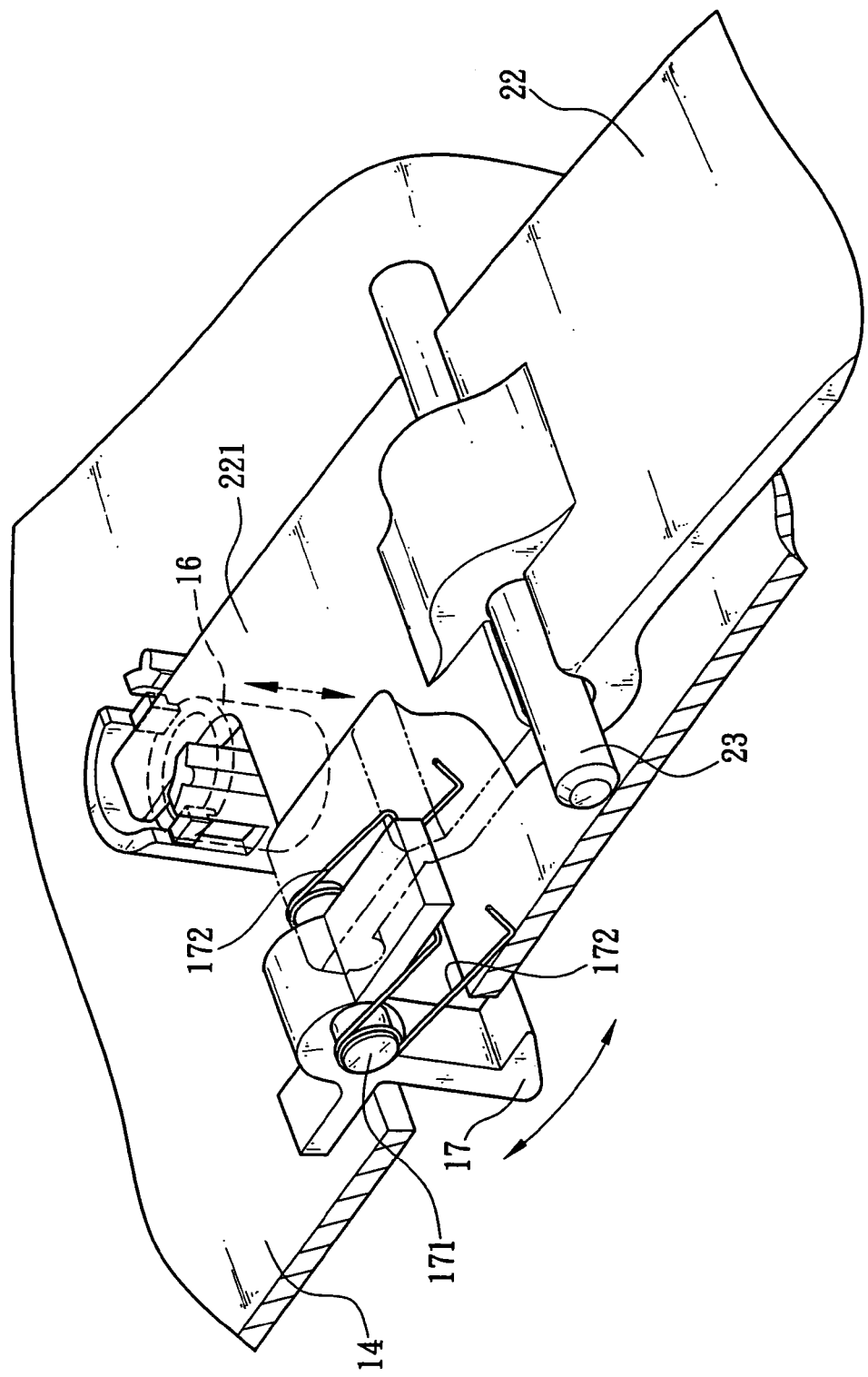
FIG. 3 is a schematic view of suspending arms, pillars, and hooks according to the present invention.

In addition, the two hooks 17 are turned to an angle and then returned to their original angle by means of another pivot 171 that is pivotally coupled to the backside of the retaining base 14 and disposed on the main body of the two hooks 17, and the other two pivots 171 include a limit spring 172 as shown in FIGS. 2 and 3, such that when the force of pressing the release button 13 disappears, the two hooks 17 resume their original angle by the action of the two other pivots 171 and the two springs 172.

In the present invention, the notebook computer 30 includes another connector 31 at its bottom as shown in FIG. 1, and the other connector 31 includes a hook hole 33 separately disposed on both ends of the other connector 31, so that if the notebook computer 30 is installed onto the retaining base 14, then the two hooks 17 will be embedded precisely into the two hook holes 33, and the other connector 31 and the connector 15 can be secured with each other.

In the present invention, the retaining base 14 includes an electromagnetic interference resisting device 18 proximate to both ends of the connector 15 as shown in FIG. 1, and the notebook computer 30 includes two concave holes 32 disposed at the bottom of the notebook computer 30, such that if the notebook computer 30 is installed onto the retaining base 14, the two concave holes 32 are precisely corresponsive to the two electromagnetic interference resisting devices 18, so as to achieve the effect of preventing electromagnetic interface.

If a user moves the switch link rod 11 to the ON position of the ON/OFF hole 102 by the locking switch 112, the penetrating hole 121 of the external edge of the blocking board 12 will be moved away form the bottom of the release button 13, so that the bottom of the release button 13 can be extended into the penetrating hole 121. By then, the release button 13 can be pressed, and the two pillars 16 are propped by the finger-shaped section 221 of the link rod 20 to press against the bottom of the notebook computer 30. In the meantime, the two hooks 17 are turned outwardly and separated from the two hook holes 33 to easily and smoothly separate another connector 31 with the connector 15, so as to prevent the related circuits or contact points on the retaining base 14 of the notebook computer 30 from being separated, fallen off, or damaged due to an improper shaking.

On the other hand, if a user moves the switch link rod 11 to an OFF position of the ON/OFF hole 102 by the locking switch 112 the external edge of the penetrating hole 121 of the blocking board 12 is moved to the bottom of the release button to block the release button 13 from entering into the penetrating hole 121. By then, the release button 13 cannot be pressed and constitutes a locked status. The notebook computer 30 cannot be removed from the retaining base 14. Regardless of the locking switch 112 being moved to the ON position or the OFF position of the ON/OFF hole 102, the two holes 111 at an end of the switch link rod 11 are moved to correspond to the lock hole 101 of the main body 10, so that the external lock can secure the holes to prevent the notebook computer 30 and the docking station 1 from being taken away or stolen by others and thus achieving the security effect.

In summation of the description above, the structure of the present invention prevents the notebook computer 30 from being separated from the docking station 1 when the notebook computer 30 is locked, so as to assure the security of the notebook computer 30 and the docking station 1.

While the invention herein disclosed has been described by means of specific embodiments, numerous modifications and variations could be made thereto by those skilled in the art without departing from the scope and spirit of the invention set forth in the claims.

What is claimed is:

1. A locking link rod structure for a docking station, being installed on a notebook computer, and said docking station comprising:
   a main body, having a lock hole and an ON/OFF hole separately disposed on a side board of said main body, and a retaining base being protruded from a side of said main body, and retaining base having a connector, and said connector having a movable pillar and a movable hook disposed separately on both sides of said connector;
   a switch link rod, movably disposed in said main body and having two holes disposed proximate to an end of said switch link rod and corresponding to said lock hole of said main body, and a locking switch being disposed at an end of said switch link rod and proximate to said two holes, and said locking switch being exposed from said ON/OFF hole of said main body;
   a release button, being exposed from said main body and disposed at another end of said switch link rod, and controlled by said switch link rod; and
   a link rod, disposed in said main body and being in a U-shape, and a transversal rod of said link rod being precisely in contact with the bottom of said release button, and a suspending arm being extended separately from both ends of said transversal rod, and the front end of said two suspending arms being situated precisely at the bottom of said two pillars and said two hooks for controlling the movements of said two pillars and said two hooks.

2. The locking link rod structure for a docking station of claim 1, wherein said switch link rod includes two support rods extended from another end of said switch link rod and having a specific distance apart, and said two support rods are disposed across a blocking board, and said blocking board includes a penetrating hole at the center, and said blocking board is limited in a limit section inside a housing of said main body, and said limit section includes another penetrating hole disposed at the center, and said other penetrating hole corresponds with said penetrating hole, and said release button is situated above said penetrating hole of said blocking board.

3. The locking link rod structure for a docking station of claim 2, wherein said switch link rod includes two sliding grooves disposed on a rod body of said switch link rod and having a specific distance apart, and said two sliding grooves include a fixing pillar therein.

4. The locking link rod structure for a docking station of claim 1, wherein said two suspending arms separately include a pivot disposed proximate to said two pillars and said two hooks and pivotally coupled to the backside of said retaining base, and said transversal rod includes a spring separately disposed at both ends of said transversal rod to hold up the backside of said retaining base.

5. The locking link rod structure for a docking station of claim 4, wherein said two hooks of said main body are pivotally coupled onto the backside of said retaining base by another pivots, and said two other pivots separately include a limit spring.

6. The locking link rod structure for a docking station of claim 1, wherein said retaining base includes an electromagnetic interference resisting device disposed separately and proximate to both ends of said connector.

* * * * *